(12) United States Patent
Jo et al.

(10) Patent No.: US 10,402,019 B2
(45) Date of Patent: Sep. 3, 2019

(54) DISPLAY DEVICE

(71) Applicant: LG DISPLAY CO., LTD., Seoul (KR)

(72) Inventors: HeungJu Jo, Chungju-si (KR);
JeongKweon Park, Gyeongsangbuk-do (KR); Chan Park, Gumi-si (KR);
SangHyun Kwon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 259 days.

(21) Appl. No.: 15/331,398

(22) Filed: Oct. 21, 2016

(65) Prior Publication Data

US 2017/0123533 A1    May 4, 2017

(30) Foreign Application Priority Data

Oct. 31, 2015 (KR) .................. 10-2015-0152833
Dec. 30, 2015 (KR) .................. 10-2015-0190310

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 2203/04103* (2013.01); *G06F 2203/04107* (2013.01)

(58) Field of Classification Search
CPC . G06F 2203/04103; G06F 2203/04107; G06F 3/041; G06F 3/044
See application file for complete search history.

(56) References Cited

U.S. PATENT DOCUMENTS

| 8,264,466 | B2 | 9/2012 | Maag et al. | |
| 2011/0210428 | A1* | 9/2011 | Bitnar | C25D 5/022 257/632 |
| 2011/0304564 | A1* | 12/2011 | Kim | G06F 3/044 345/173 |
| 2012/0044662 | A1* | 2/2012 | Kim | G06F 3/0418 361/816 |

(Continued)

FOREIGN PATENT DOCUMENTS

| EP | 2544076 A2 | 1/2013 |
| JP | 2009-086184 A | 4/2009 |

(Continued)

*Primary Examiner* — Hong Zhou
(74) *Attorney, Agent, or Firm* — Dentons US LLP (57) ABSTRACT

Provided is a display device that includes a display panel defined with an active area displaying an image and an inactive area outside the active area, the display panel including a substrate having a first surface and a second surface opposite the first surface; a plurality of pixels on the first surface of the substrate in the active area, each pixel including a pixel drive circuit; a transparent conductive layer on the second surface of the substrate covering the active area and a part of the inactive area; and a metal pattern on the second surface of the substrate in the inactive area, the metal pattern electrically connected to the transparent conductive layer, receiving an electrical signal and having a lower resistance than the transparent conductive layer, wherein the metal pattern serves as a conductive path to reduce a potential difference with respect to the electrical signal in an entire area of the transparent conductive layer compared to a display device without the metal pattern.

18 Claims, 7 Drawing Sheets

(56) References Cited

U.S. PATENT DOCUMENTS

| | | | |
|---|---|---|---|
| 2012/0062511 A1 | 3/2012 | Ishizaki et al. | |
| 2012/0306791 A1* | 12/2012 | Lee | G06F 3/041 345/173 |
| 2013/0063393 A1* | 3/2013 | Kurishima | B32B 7/02 345/174 |
| 2013/0329171 A1* | 12/2013 | Xu | G02F 1/134363 349/106 |
| 2014/0118639 A1* | 5/2014 | Matsushima | G02F 1/13338 349/12 |
| 2014/0293144 A1* | 10/2014 | Bae | G06F 3/041 349/12 |
| 2015/0049263 A1* | 2/2015 | Chu | G06F 3/041 349/12 |
| 2015/0084888 A1 | 3/2015 | Han et al. | |
| 2015/0169109 A1 | 6/2015 | Park | |
| 2015/0316812 A1* | 11/2015 | Mayumi | G02F 1/133308 349/12 |
| 2016/0092011 A1 | 3/2016 | Kong et al. | |
| 2016/0132148 A1* | 5/2016 | Han | G06F 3/044 345/174 |
| 2017/0038870 A1* | 2/2017 | Lin | G09G 5/003 |

FOREIGN PATENT DOCUMENTS

| | | |
|---|---|---|
| KR | 10-2011-0026819 A | 3/2011 |
| KR | 10-2016-0036933 A | 4/2016 |
| KR | 10-2016-0105205 A | 9/2016 |

\* cited by examiner

DISPLAY DEVICE

CROSS-REFERENCE TO RELATED APPLICATIONS

This application claims the priority of Korean Patent Application No. 10-2015-0152833 filed on Oct. 31, 2015 and Korean Patent Application No. 10-2015-0190310 filed on Dec. 30, 2015, in the Korean Intellectual Property Office, the disclosure of which is incorporated herein by reference for all purposes as if fully set forth herein.

BACKGROUND

Field

The present disclosure relates to a display device and a method of manufacturing the same and more particularly, to a display device including an in-cell touch sensor.

Description of the Related Art

Conventionally, a touch screen panel has been manufactured separately and then bonded to a display panel when implementing a display device capable of recognizing a user's touch. That is, a touch electrode has been formed separately using a glass substrate, a plastic substrate, a film or a sheet as a supporting member. Then, the supporting member on which the touch electrode is formed has been bonded to a display panel with an adhesive sheet or an adhesive to implement a touch function.

In recent years, the conventional technology has been replaced with a technology of forming a touch sensor in a display panel according to the trend toward lightweight and slim display devices. That is, a touch electrode is deposited on a display panel using the display panel as a supporting member without a separate supporting member, or a touch sensor is disposed within the display panel. Thus, a display device including the display panel with a touch function has been implemented.

When a touch sensor is formed within a display panel, the touch sensor is physically very close to various components of the display panel. Thus, the interference between the touch sensor and the other components needs to be considered. In order for the touch sensor of the display device to recognize a user's touch more precisely, it may be necessary to consider factors that cause unintended interference in the touch sensor. However, due to the industry trend toward ultra-slim display panels, unintended interference has not been addressed to satisfaction.

Further, two types of touch sensors are embedded together in the display device to recognize a user's touch to provide the user with various user-interfaces (UI) and user-experiences (UX) while displaying an image. In order for such multiple touch sensors to recognize a user's touch harmoniously without interfering with each other, it may be necessary to optimize the positional relationship between the two types of touch sensors.

SUMMARY

Accordingly, the present disclosure is directed to provide a display device and a method for manufacturing the same that substantially obviate one or more problems due to limitations and disadvantages of the related art.

An advantage of the present disclosure is to provide a display device with enhanced touch function.

According to a conventional technology, a touch sensor is embedded in a display panel, so that direct and indirect influences of various components of the display panel on the touch sensor may be increased. Particularly, if the touch sensor is a projected capacitive touch sensor, a touch signal is recognized by measuring capacitance values of one touch electrode and a user or by measuring a capacitance value between touch electrodes upon a user's touch. In this case, capacitance values to be measured can be changed due to the interference with various components of the display panel. Such a change may deteriorate a touch function. Further, as for a pixel drive circuit of the display panel, the characteristics of each component can be changed by direct and indirect influences of the touch sensor. Such a change may deteriorate an image quality. Furthermore, since a pressure-sensitive touch sensor and an in-cell capacitive touch sensor are embedded together, interference may occur between the two touch sensors. Such interference may deteriorate a touch sensing accuracy.

An object to be achieved by an embodiment of the present disclosure is to provide a display device in which a metal pattern having a width of several hundred nm and making an interface with a conductive layer is formed on a lower substrate whose one surface is covered with the conductive layer.

Another object to be achieved by an embodiment of the present disclosure is to provide a display device in which a metal pattern which makes an interface with a conductive layer is formed using a printing or dispensing process so as not to damage components of a display panel.

Yet another object to be achieved by an embodiment of the present disclosure is to provide a display device in which a ground voltage can be applied to a conductive layer through a metal pattern having a low sheet resistance in order to block interference in sensing a user's touch by an in-cell capacitive touch sensor.

Still another object to be achieved by an embodiment of the present disclosure is to provide a display device in which a conductive layer functioning as a secondary sensor or facing sensor of a pressure-sensitive touch sensor is disposed between an in-cell capacitive touch sensor and the pressure-sensitive touch sensor. Thus, a touch sensor can be applied more easily and rapidly to the conductive layer through a metal pattern having a low sheet resistance.

Still another object to be achieved by an embodiment of the present disclosure is to provide a display device including a conductive layer that has conductivity and light transmissive characteristic and also satisfies optical characteristics and electrical characteristics for a low level of external light reflection.

Still another object to be achieved by an embodiment of the present disclosure is to provide a display device in which an FPC and a conductive layer are electrically connected through a metal pattern, and, thus, a contact resistance is low at an interface and the conductive layer is grounded more stably as compared with a case where the FPC and the conductive layer are electrically connected without the metal pattern.

Still another object to be achieved by an embodiment of the present disclosure is to provide a display device in which a metal pattern is formed continuously along all edges of a bottom surface of a conductive layer, and, thus, an interface between the metal pattern and the conductive layer functions as a path for electrical signals to be applied to the conductive layer and the conductive layer can become an equipotential surface more rapidly.

Still another object to be achieved by an embodiment of the present disclosure is to provide a display device in which a conductive layer is grounded more stably by a metal pattern, and, thus, a noise of a user's touch signal sensed by an in-cell capacitive touch sensor can be minimized.

Still another object to be achieved by an embodiment of the present disclosure is to provide a display device in which static electricity accumulated in the display device is effectively discharged through a conductive layer by a metal pattern.

The advantages and objects of the present disclosure are not limited to the aforementioned objects, and other objects, which are not mentioned above, will be apparent to a person having ordinary skill in the art from the following description.

According to an aspect of the present disclosure, there is provided a display device including an in-cell capacitive touch sensor and a pressure-sensitive touch sensor. In the display device, a light-transmitting conductive layer is disposed on the entire bottom surface of a lower substrate. An opaque metal pattern is formed into a closed-loop shape along an edge of the conductive layer. Thus, even if the light-transmitting conductive layer has a relatively large size, it can receive an electrical signal through the metal pattern having a low sheet resistance and thus can rapidly form an equipotential surface.

According to an aspect of the present disclosure, there is provided a display device that includes a display panel defined with an active area displaying an image and an inactive area outside the active area, the display panel including a substrate having a first surface and a second surface opposite the first surface; a plurality of pixels on the first surface of the substrate in the active area, each pixel including a pixel drive circuit; a transparent conductive layer on the second surface of the substrate covering the active area and a part of the inactive area; and a metal pattern on the second surface of the substrate in the inactive area, the metal pattern electrically connected to the transparent conductive layer, receiving an electrical signal and having a lower resistance than the transparent conductive layer, wherein the metal pattern serves as a conductive path to reduce a potential difference with respect to the electrical signal in an entire area of the transparent conductive layer compared to a display device without the metal pattern.

According to an aspect of the present disclosure, there is provided a display panel defined with an active area displaying an image and an inactive area outside the active area, the display panel including a substrate having a first surface and a second surface opposite the first surface; a plurality of pixels on the first surface of the substrate in the active area, each pixel including a pixel drive circuit; a transparent conductive layer on the second surface of the substrate covering the active area and a part of the inactive area; and a metal pattern on an outer edge of the transparent conductive layer in the inactive area.

Details of the exemplary embodiments of the present disclosure will be included in the detailed description of the disclosure and the accompanying drawings.

According to an embodiment of the present disclosure, it is possible to provide a display device in which a metal pattern having a width of several hundred nm and making an interface with a conductive layer is formed on a lower substrate whose one surface is covered with the conductive layer.

Further, according to an embodiment of the present disclosure, it is possible to provide a display device in which a metal pattern which makes an interface with a conductive layer is formed using a printing or dispensing process so as not to damage components of a display panel.

Furthermore, according to an embodiment of the present disclosure, it is possible to provide a display device in which a ground voltage can be applied to a conductive layer through a metal pattern having a low sheet resistance in order to block interference in sensing a user's touch by an in-cell capacitive touch sensor.

Also, according to an embodiment of the present disclosure, it is possible to provide a display device in which a conductive layer functioning as a secondary sensor or facing sensor of a pressure-sensitive touch sensor is disposed between an in-cell capacitive touch sensor and the pressure-sensitive touch sensor. Thus, a touch sensor can be applied more easily and rapidly to the conductive layer through a metal pattern having a low sheet resistance.

Further, according to an embodiment of the present disclosure, it is possible to provide a display device including a conductive layer that has conductivity and light transmissive characteristic and also satisfies optical characteristics and electrical characteristics for a low level of external light reflection.

Furthermore, according to an embodiment of the present disclosure, it is possible to provide a display device in which an FPC and a conductive layer are electrically connected through a metal pattern, and, thus, a contact resistance is low at an interface and the conductive layer is grounded more stably as compared with a case where the FPC and the conductive layer are electrically connected without the metal pattern.

Also, according to an embodiment of the present disclosure, it is possible to provide a display device in which a metal pattern is formed continuously along all edges of a bottom surface of a conductive layer, and, thus, an interface between the metal pattern and the conductive layer functions as a path for electrical signals to be applied to the conductive layer and the conductive layer can become an equipotential surface more rapidly.

Further, according to an embodiment of the present disclosure, it is possible to provide a display device in which a conductive layer is grounded more stably by a metal pattern, and, thus, a noise of a user's touch signal sensed by an in-cell capacitive touch sensor can be minimized.

Furthermore, according to an embodiment of the present disclosure, it is possible to provide a display device in which static electricity accumulated in the display device is effectively discharged through a conductive layer by a metal pattern.

The effects of the present disclosure are not limited to the aforementioned effects, and other effects, which are not mentioned above, will be apparent to a person having ordinary skill in the art from the following description.

The objects to be achieved by the present disclosure, the aspects, and the effects of the present disclosure described above do not specify essential features of the claims, and, thus, the scope of the claims is not limited to the disclosure of the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE ILLUSTRATED EMBODIMENTS

Advantages and features of the present disclosure, and methods for accomplishing the same will be more clearly understood from various exemplary embodiments described below with reference to the accompanying drawings. However, the present disclosure is not limited to the following exemplary embodiments but may be implemented in various different forms. The various exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like shown in the accompanying drawings for describing the exemplary embodiments of the present disclosure are merely examples, and the present disclosure is not limited thereto.

Throughout the whole specification, the same reference numerals denote the same elements.

In the following description, a detailed explanation of well-known related technologies may be omitted to avoid unnecessarily obscuring the subject matter of the present disclosure.

The terms such as "including," "having," and "consist of" used herein are generally intended to allow other components to be added unless the terms are used with the term "only".

Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present disclosure.

In describing components of the present disclosure, terms such as first, second, A, B, (a), (b), etc. can be used. These terms are used only to differentiate the components from other components. Therefore, the nature, order, sequence, or number of the corresponding components is not limited by these terms. It is to be understood that when one element is referred to as being "connected to" or "coupled to" another element, it may be directly connected to or directly coupled to another element, connected to or coupled to another element, having still another element "intervening" therebetween, or "connected to" or "coupled to" another element via still another element.

The features of various exemplary embodiments of the present disclosure can be partially or entirely bonded to or combined with each other and can be interlocked and operated in technically various ways as can be fully understood by a person having ordinary skill in the art, and the various exemplary embodiments can be carried out independently of or in association with each other.

Hereinafter, a display device 100 according to an exemplary embodiment of the present disclosure will be described with reference to FIG. 1.

Figure 1:
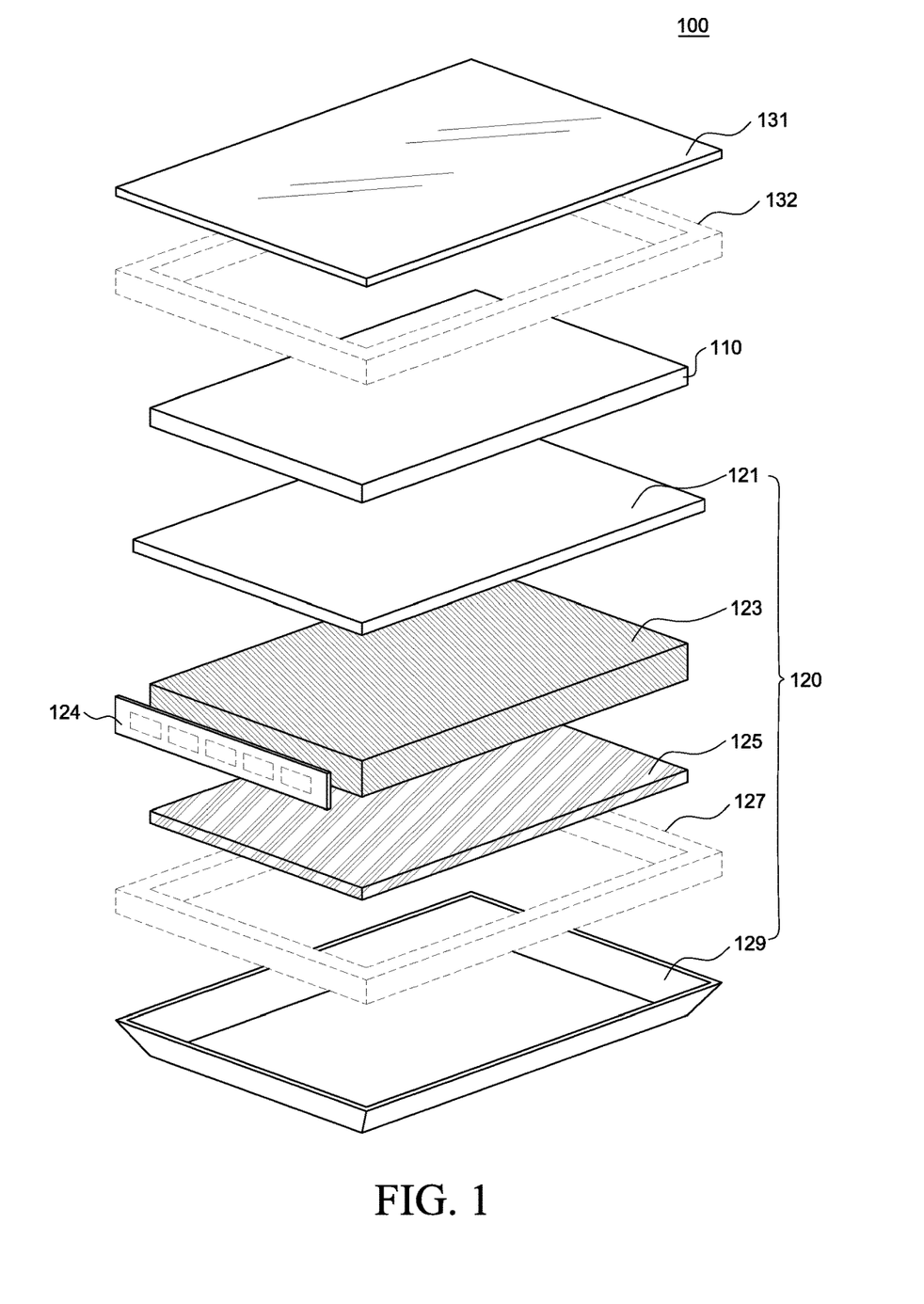
FIG. 1 is an exploded perspective view of a display device according to an exemplary embodiment of the present disclosure.

FIG. 1 is an exploded perspective view of the display device 100 according to an exemplary embodiment of the present disclosure.

Referring to FIG. 1, the display device 100 according to an exemplary embodiment of the present disclosure includes a display panel 110 for displaying an image, a backlight unit 120 for supplying light from a back surface of the display panel 110, and a cover glass 131 for protecting a screen of the display device 100.

The display panel 110 includes a lower substrate 230 on which a pixel-array layer 242 is disposed and an upper substrate 240 on which a color filter layer 232 is disposed. The lower substrate 230 and the upper substrate 240 are bonded together, facing each other, with a light control material therebetween.

The backlight unit 120 includes an optical sheet 121, a light guide plate 123 under the optical sheet 121, a light source 124 beside or under the light guide plate 123, and a pressure-sensitive touch sensor 125 under the light source 124 and the light guide plate 123. Further, the backlight unit 120 includes a cover bottom 129 disposed under the pressure-sensitive touch sensor 125 to receive other components of the backlight unit 120 and connected to a ground line of a system to connect the display device 100 to the ground.

The light source 124 may be, for example, an edge-type or direct-type LED assembly. The LED assembly may include a plurality of LED packages and a PCB on which the plurality of LED packages are aligned and mounted at a predetermined distance from each other. Alternatively, the light source 124 may be a fluorescent lamp such as a cold cathode fluorescent lamp or an external electrode fluorescent lamp. FIG. 1 illustrates the light source 124 as being of edge type, but the light source 124 may be of direct type and is not limited thereto. If the light source 124 is a direct-type LED assembly, the light guiding plate 123 may be omitted from the backlight unit 120. If a fluorescent lamp is used as the light source 124, the backlight unit 120 may further include a lamp guide to protect the fluorescent lamp and to concentrate light toward the light guide plate 123.

The display panel 110 and the backlight unit 120 are modularized into one body by a guide panel 127, a front frame 132, and the cover bottom 129 and constitute the display device 100. For example, the display device 100 according to an exemplary embodiment of the present disclosure may further include the front frame 132 in order to accommodate various modularized components of the display panel 110 and the backlight unit 120. The front frame 132 may be configured to cover a top surface edge and a lateral surface of the display panel 110. Alternatively, the display panel 110 and the backlight unit 120 whose edges are surrounded by the guide panel 127 having a square frame shape may be settled on the cover bottom 129 and integrated into one body.

Details of the display panel 110 will be described later with reference to FIG. 2A, FIG. 2B, and FIG. 5.

Figure 2A:
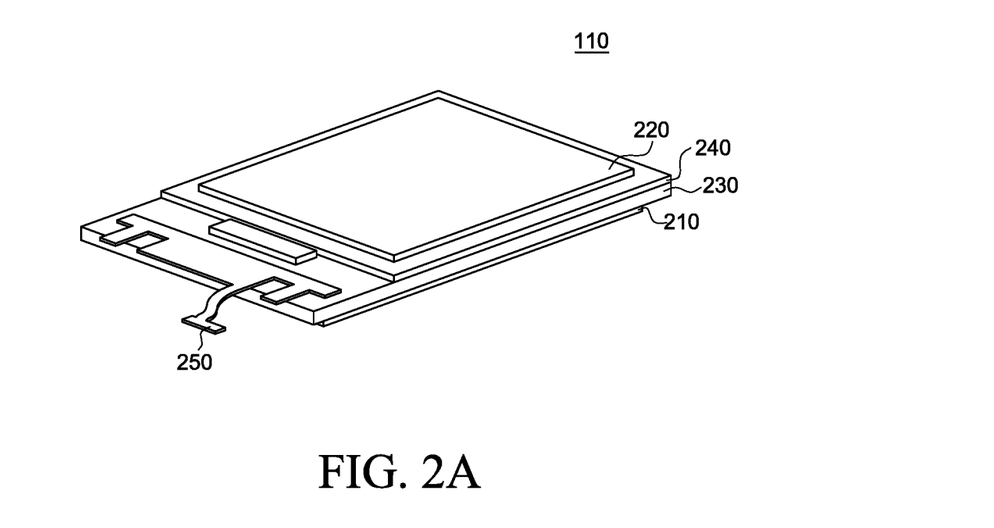
FIG. 2A is a perspective view of a display panel illustrating a top surface of the display panel according to an exemplary embodiment of the present disclosure.

FIG. 2A is a perspective view of the display panel 110 illustrating a top surface of the display panel 110 according to an exemplary embodiment of the present disclosure.

Referring to FIG. 2A, the display panel 110 includes the lower substrate 230 and the upper substrate 240 bonded to each other so as to implement a cell state. Further, a lower polarizing plate 210 and an upper polarizing plate 220 are bonded to top surfaces of cells, respectively. That is, the display panel 110 includes the lower substrate 230, the upper substrate 240, the lower polarizing plate 210, and the upper polarizing plate 220.

On a top surface of the lower substrate 230, gate lines for applying various driving signals to pixels and data lines for applying a data voltage to the pixels are disposed. A plurality of pixels are disposed corresponding to intersections between the gate lines and the data lines on the display panel 110. As will be described later with reference to FIG. 6, a pixel-array layer 242 including a plurality of pixel drive circuits respectively corresponding to the plurality of pixels is disposed on a top surface of the lower substrate 230. Further, on a bottom surface of the upper substrate 240, a color filter layer 232 including a plurality of color filters respectively corresponding to the plurality of pixels is disposed.

Each pixel includes two electrodes that form an electric field. The two electrodes forming an electric field are referred to as a pixel electrode and a common electrode. The pixel electrode receives a data voltage intrinsic to each pixel from a data line. The common electrode is disposed correspondingly to the pixel electrode so as to form a horizontal electric field or vertical electric field with the pixel electrode. The common electrode is implemented such that the same voltage can be applied to all of the plurality of pixels. Unlike the pixel electrode, the common electrode may thus be implemented as one body with respect to all of the plurality of pixels. Alternatively, the plurality of pixels may be grouped into several blocks and the common electrode may be provided to each pixel block. That is, the common electrode may comprise a plurality of common electrode blocks. The common electrode is positioned on a path of the light radiated to the outside of the display device 100 and thus may be formed of a material having an excellent light transmissive characteristic. For example, the common electrode may be formed of a transparent conductive material such as indium-tin oxide (ITO).

Since the plurality of pixels are disposed on the display panel 110, the display panel 110 is divided into an active area A/A where an image is displayed and an inactive area I/A surrounding the active area A/A.

While the pixel drive circuits are configured on a top surface of the lower substrate 230, a gate driver for applying electrical signals to the gate lines may also be mounted on the top surface of the lower substrate 230. Such a mounting method is referred to as a gate-in-panel (GIP) method by which the gate driver is mounted on the top surface of the lower substrate 230 except the area where the pixel drive circuits are disposed.

Besides a space corresponding to the plurality of pixels, the lower substrate 230 may include a space for securing various circuit components such as a source driver 290, which will be described later with reference to FIG. 7. For example, the space for securing various circuit components may be prepared in the inactive area I/A corresponding to one side of the lower substrate 230. To this end, the lower substrate 230 may have a larger size than the upper substrate 240. Further, a partial area of the lower substrate 230 which is not overlapped with the upper substrate 240 corresponds to the inactive area I/A.

An FPC 250 is bonded to one side of an edge of the top surface of the lower substrate 230 which is not overlapped with the upper substrate 240 and thus partially exposed. Various electrical signals are supplied from the outside of the display panel 110 to the display panel 110 through the FPC 250, including a predetermined electrical signal applied to a conductive layer IM.

The lower polarizing plate 210 bonded to the bottom surface of the lower substrate 230 has a smaller size than the lower substrate 230. Both the upper polarizing plate 220 and the lower polarizing plate 210 have a greater size than the active area A/A. Further, both the upper polarizing plate 220 and the lower polarizing plate 210 are overlapped with an entire active area A/A. As a result, the lower polarizing plate 210 is disposed over from the active area A/A to the inactive area I/A. Accordingly, the portion of the lower substrate 230 in the inactive area I/A is not overlapped with the upper substrate 240 so that a part of the top surface of the lower substrate 230 is exposed.

Further, the FPC 250 is bonded to an exposed part of the top surface of the lower substrate 230. A partial area of the FPC 250 is not overlapped with the top surface of the lower substrate 230. On the partial area of the FPC 250 which is not overlapped with the lower substrate 230, a FPC connection pad 251 is disposed. That is, on the partial area of the FPC 250 protruding toward a lateral surface of the display panel 110, the FPC connection pad 251 is disposed. The FPC connection pad 251 is disposed and electrically connected to a closed-loop-shaped metal pattern MP formed on a bottom surface of the lower substrate 230. The metal pattern MP in contact with the bottom surface of the lower substrate 230 will be described later with reference to FIG. 2B and FIG. 3. The FPC 250 will be described later with reference to FIG. 5 and FIG. 7.

Figure 2B:
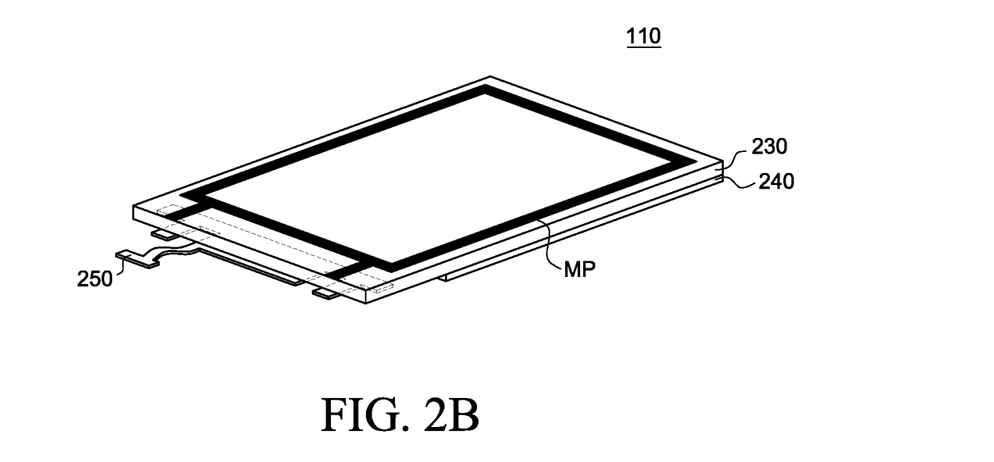
FIG. 2B is a perspective view of a display panel illustrating a bottom surface of the display panel in a cell state.

FIG. 2B is a perspective view of a display panel illustrating a bottom surface of the display panel in a cell state. A structure in which the lower substrate 230 and the upper substrate 240 are bonded to each other as being spaced away from each other is referred to as a cell. That is, FIG. 2B illustrates a state where the upper polarizing plate 220 and the lower polarizing plate 210 of the display panel 110 are not bonded to the cell. In the display panel 110 according to an exemplary embodiment of the present disclosure, the metal pattern MP having a closed-loop shape is formed along an edge of the bottom surface of the lower substrate 230.

More specifically, the metal pattern MP having a lower sheet resistance than the conductive layer IM is formed into a closed-loop shape along an edge of the conductive layer IM in order to reduce or minimize a potential difference between a point of the conductive layer IM relatively far from the FPC connection pad 251 and a point of the conductive layer IM relatively close to the FPC connection pad 251. The metal pattern MP having a lower sheet resistance than the conductive layer IM functions as a conductive highway to uniformly transfer a predetermined electrical signal with a reduced or minimized RC delay from the FPC connection pad 251 to an entire area of the conductive layer IM.

The metal pattern MP includes at least two branches, extension parts EX. The extension parts EX of the metal pattern MP protrude toward the outside of a ring of the metal pattern MP. In other words, the extension parts EX protrude toward an edge of the display panel 110. The extension parts EX are disposed to be adjacent to the FPC connection pad 251. A specific position of the metal pattern MP and the extension parts EX will be described later with reference to FIG. 3 and FIG. 4.

Figure 3:
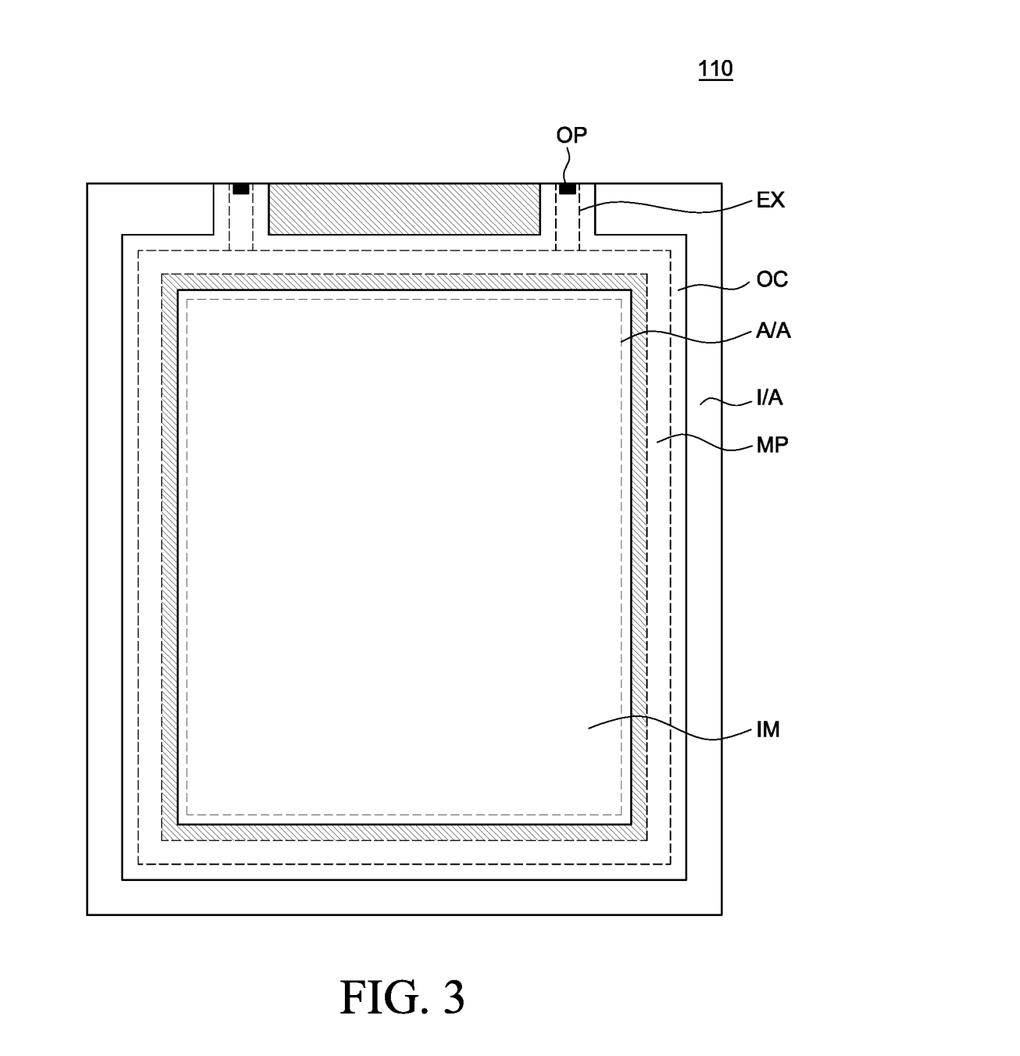
FIG. 3 is an enlarged plan view of the bottom surface of the display panel illustrated in FIG. 2B.

FIG. 3 is an enlarged plan view of a bottom surface of the display panel illustrated in FIG. 2B.

The conductive layer IM, which is continuously deposited over from the active area A/A to the inactive area I/A, may be disposed on the bottom surface of the lower substrate 230. The conductive layer IM beneficially has a light reflectance of less than 1% in a visible light wavelength range. Thus, it can serve as a path of the light generated inside the display device 100 and radiated to the outside. Also, the conductive layer IM beneficially has a sheet resistance of less than 300 Ω/sq. Thus, it can form an equipotential surface more rapidly and uniformly.

The conductive layer IM may have a multi-layered structure in which a layer having a high refractive index and a layer having a low refractive index are alternately laminated in sequence. For example, the conductive layer IM may include a first inorganic layer having a refractive index of n1, a second inorganic layer having a refractive index of n2, and a third inorganic layer having a refractive index of n3 which are laminated in sequence. Herein, n1, n2, and n3 may have the relationship of n2<n1 and n2<n3 with respect to light in a visible light wavelength range. One or more of the first to third inorganic layers may be formed of a conductive material. For example, the third inorganic layer may be formed by depositing indium-tin oxide. In this case, the third inorganic layer may be formed to a thickness of at least 250 Å in order for the conductive layer IM to have a low sheet resistance.

Meanwhile, when the third inorganic layer is formed of a conductive transparent material such as indium-tin oxide (ITO), a light transmittance of the third inorganic layer decreases as a thickness of the third inorganic layer increases. In order to compensate for the light transmittance of the third inorganic layer, the second inorganic layer having a low refractive index and the first inorganic layer having a high refractive index are alternately laminated. For example, the first inorganic layer may be formed of niobium oxide ($Nb_2O_5$), the second inorganic layer may be formed of silicon oxide ($SiO_2$), and the third inorganic layer may be formed of indium-tin oxide (ITO). Thus, the conductive layer IM having a light reflectance of less than 1%, a light transmittance of 95% or more, and a sheet resistance of 300 Ω/sq or less can be obtained.

Further, in case of forming the third inorganic layer of indium-tin oxide (ITO), if the thickness of the third inorganic layer is increased to reduce a sheet resistance of the conductive layer IM, the light reflectance is increased to 1% or more or the light transmittance is decreased to less than 90%. Thus, the conditions for forming the third inorganic layer of indium-tin oxide (ITO) are adjusted such that the conductive layer IM beneficially has a sheet resistance of of 300 Ω/sq or less and a light reflectance of 1% or less. If a size of the conductive layer IM is increased due to increase in a size of the display panel 110, the specific resistance of the conductive layer IM alone may not be able to rapidly form an equipotential surface on an entire area of the conductive layer IM. When an electrical signal is applied to the conductive layer IM through application points, there may be a potential difference between the application points and a point at the conductive layer IM located far from the application points. Such a potential difference is proportional to a size of the conductive layer IM.

To address such a problem, a predetermined electrical signal for forming equipotential of the conductive layer IM is applied through the metal pattern MP that has a lower sheet resistance than the conductive layer IM and is beneficially in contact with an entire edge of the conductive layer IM. That is, it is beneficial for the metal pattern MP and the conductive layer IM to form an interface as large as possible without invading the active area A/A. Thus, a predetermined electrical signal can be applied to the conductive layer IM through the interface formed by the contact between the metal pattern MP and the conductive layer IM.

The metal pattern MP having a lower sheet resistance than the conductive layer IM is disposed on a bottom surface of the lower substrate 230 on which the conductive layer IM is formed. As a result, the metal pattern MP is in contact with a bottom surface of the conductive layer IM. More specifically, the metal pattern MP forms an interface with the third inorganic layer of the conductive layer IM. In other words, the metal pattern MP is in direct contact with the one surface of the third inorganic layer that provides conductivity to the conductive layer IM. As a size of the interface between the opaque metal pattern MP and the light-transmitting conductive layer IM increases, a contact resistance between the metal pattern MP and the conductive layer IM decreases. Thus, when disposed corresponding to the inactive area I/A, the metal pattern MP may be formed into a closed-loop shape along an edge of one surface of the conductive layer IM so as to increase or maximize a size of the interface between the metal pattern MP and the light-transmitting conductive layer IM. For example, if the display panel 110 has a square shape in a plan view, the metal pattern MP may have a square ring shape. Also, the metal pettern may have a closed-loop shape, but the present disclosure is not limited thereto. For example, referring to FIGS. 2B to 3, a portion of the metal pattern MP extended between the two extention parts EX may be opened so that the metal pattern MP may have an open-loop shape.

When the metal pattern MP is opaque, it is desired to not invade the active area A/A as much as possible as described above. In other words, the metal pattern MP is disposed such that a size of the interface between the metal pattern MP and the light-transmitting conductive layer IM is increased or maximized, and at the same time, the metal pattern MP does not invade the active area A/A as much as possible. For example, the metal pattern MP may surround the active area A/A of the lower substrate 230. That is, the metal pattern MP may be formed into a closed-loop shape along an edge of the bottom surface of the conductive layer IM. The metal pattern MP may be printed on the bottom surface of the lower substrate 230 using metal ink to have a closed-loop shape.

The metal ink refers to a composition in a paste state in which highly conductive particles such as metal particles are dispersed in a solvent. The metal ink has liquidity, viscosity and surface tension suitable to be formed into a line shape by an ink-jet printing method. The metal ink may include, as a base, an organic solvent which is in liquid state at room temperature and in which metal particles can be uniformly dispersed. Further, the metal ink may include a dispersing agent that promotes uniform dispersion of the metal particles in the solvent. For example, the organic solvent may be a polar organic material, such as triethyleneglycolmonoethylether (TGME, $C_8H_{18}O_4$), having an alcohol functional group with viscosity. Otherwise, the organic solvent may be an alkali material such as tetramethylammoniumhydroxide (TMAH, $(CH_3)_4NOH$)). The organic solvent included in the metal ink may be a polar organic solvent by way of example. An organic solvent having different properties may be included in the metal ink considering the properties of the metal particles, the properties of the dispersing agent, the properties of the substrate to which printing is performed, and the properties of a cleaning solution used in a cleaning process after sintering.

The metal pattern MP may include a metal material or a metal alloy material, such as silver (Ag), copper (Cu), molybdenum (Mo), chromium (Cr), etc., having an excellent conductivity. That is, the metal particles included in the metal ink may be a metal material or a metal alloy material, such as silver (Ag), copper (Cu), molybdenum (Mo), chromium (Cr), etc., having an excellent conductivity. If the conductive layer IM includes indium-tin oxide (ITO) to achieve a high light transmittance, the metal pattern MP beneficially has a line resistance of 1 Ω/mm or less in order for the metal pattern MP to have a lower sheet resistance than the conductive layer IM. A sheet resistance is a value derived by applying various correction factors including the thickness and the shape of a measurement target to a line resistance which is a unique characteristic of the measurement target. Typically, the sheet resistance is measured by a 4-probe test.

Securing a low sheet resistance means securing a low line resistance. For example, if the metal pattern MP is formed of silver (Ag) having a lower specific resistance than indium-tin oxide (ITO), a contact resistance between the conductive layer IM and the metal pattern MP is decreased. If the metal pattern MP is formed of silver (Ag), a line resistance of the metal pattern MP may be decreased to at least 0.005 Ω/mm. Therefore, the metal pattern MP may have a line resistance of 0.005 Ω/mm to 1 Ω/mm. If the metal pattern MP is formed of silver (Ag), when the metal pattern MP has a width W of 400 nm to 800 nm and a height of 0.1 µm to 1 µm, the metal pattern MP may have a line resistance of 0.005 Ω/mm to 1 Ω/mm. That is, if the metal pattern MP is formed of silver (Ag), when the metal pattern MP has a width W of 400 nm to 800 nm and a height of 0.1 µm to 1 µm, the metal pattern MP has a lower sheet resistance than the conductive layer IM including indium-tin oxide (ITO). If the metal pattern MP is formed of silver (Ag), when the metal ink used for forming the metal pattern MP contains silver (Ag) particles in a weight ratio of 20% to 30% and the metal ink has a viscosity of 10 cp to 30 cp, the metal pattern MP may have a width W of 400 nm to 800 nm and a height of 0.1 µm to 1 µm.

The metal pattern MP may be formed thick enough to have a lower sheet resistance than the light-transmitting conductive layer IM. In order to form a thick metal pattern MP by deposition, a long manufacturing time is typically required, meaning that the display panel 110 may be exposed to damage for a long time during the manufacturing process. That is, the environmental conditions for manufacturing the metal pattern MP and the amount of time for manufacturing the metal pattern MP are major factors to be managed for the performance of the display device 100.

If the metal pattern MP is manufactured by printing or dispensing, the uniformity at a surface or edge of the metal pattern MP may be decreased as compared with a case where the metal pattern MP is manufactured by deposition. However, it is possible to form the metal pattern MP having a large thickness in a much shorter time. That is, if the metal pattern MP is formed of a material which can be printed or dispensed, a surface or edge of the metal pattern MP may have a low uniformity as compared with a case where the metal pattern MP is formed of a material which can be deposited. As for a thick and wide metal pattern MP having a thickness of several µm or a width of several hundred nm, the accuracy in shape is relatively not important as compared with a metal pattern constituting a micro integrated circuit. Therefore, if the thick and wide metal pattern MP having a thickness of several µm or a width of several hundred nm is formed, it is preferable to manufacture the metal pattern MP by printing or dispensing. When the metal pattern MP is manufactured by printing or dispensing, a thickness and a width of the metal pattern MP can be adjusted by regulating a discharge amount or viscosity of the metal ink.

As described above, the metal pattern is formed by printing or dispensing a metal ink. Therefore, the metal ink is formed of a material which can be printed or dispensed. The printing or dispensing method may be of pneumatic type, piezo type, and electric type, which are just examples, but may not be limited thereto. The pneumatic-type method uses an air pressure control and a micro-processor-based timer. The piezo-type method is a method of pushing a liquid using the piezoelectric principle. The electric-type method is a method of forming electromagnetism on a coil and pushing a liquid.

For example, the pneumatic-type method may be a method of discharging a liquid by driving a pneumatic piston with a ball tip at its end and a spring. If the piston is raised by pneumatic pressure, a liquid in a syringe is discharged by pneumatic pressure through a jet nozzle. If the pneumatic pressure of the piston is blocked, the piston blocks the jet nozzle by return spring pressure and stops a discharge of the liquid. The liquid is discharged by repeatedly performing a piston motion using pneumatic pressure and an operation using return spring pressure.

For example, the piezo-type method may be a method of discharging a liquid by installing a piezoelectric linear motor using a piezoelectric actuator, which can be precisely controlled in displacement by an application voltage, in a syringe and using piezoelectricity as a driving source. Since it is possible to perform a high-speed and high-precision control, it is possible to discharge the liquid in a very small amount. Further, the discharge amount of the liquid can be controlled according to a change in waveform of a driving voltage, a driving frequency, and an application voltage applied to a piezoelectric element.

For example, the electric-type method may be a method of discharging a liquid by moving a coil up and down according to a solenoid driving method. In the electric-type method like the piezo-type method, an actuator may be installed in a syringe. A solenoid valve can be controlled with low power and uses an electrical signal, and, thus, it is possible to rapidly control an opening/closing time. Further, it is possible to precisely control the discharge amount of the liquid by appropriately adjusting the number of times of winding the coil and an input current.

As described above, the metal pattern MP according to an exemplary embodiment of the present disclosure may be formed by printing or dispensing. The metal pattern MP is formed by drying and curing a printed metal ink. In this case, the solvent or the dispersing agent included in the metal ink may remain in the metal pattern MP. That is, the metal pattern MP may include not only a metal material or a metal alloy material but also an organic material such as the solvent or the dispersing agent.

The liquidity of the metal ink is removed by removing the solvent from the metal ink and the metal particles are sintered at a high temperature in order for the metal ink printed on the lower substrate 230 to be fixed to the lower substrate 230. Thus, the cured metal pattern MP can be obtained.

Then, a washing process is performed using distilled water such that the lower polarizing plate 210 can be bonded to the bottom surface of the lower substrate 230 without foreign materials. Since various foreign materials are generated and remain on the lower substrate 230 and the upper substrate 240 while the metal ink is dried and sintered, it is typically desired to wash a surface of the cell. In order to avoid the loss of the metal pattern MP during the washing process with distilled water, the metal pattern MP is covered with a protective coating layer OC before the washing process. In order to insulate the metal pattern MP from the other components, the protective coating layer OC may include an insulation material. For example, the protective coating layer OC may include a tetramethylammoniumhydroxide (TMAH, $(CH_3)_4NOH$))—, ethyleneglycol-, or polyimide-based material. Similar to the metal pattern MP, the protective coating layer OC may be formed by printing a protective material having viscosity and liquidity on the lower substrate 230 so as to cover the metal pattern MP and then curing the protective material. The protective coating layer OC may also surround the active area A/A along the inactive area I/A so as not to invade the active area A/A.

Since the protective coating layer OC covers the metal pattern MP, the protective coating layer OC may have a greater width than the metal pattern MP. Therefore, there is an area where the lower substrate 230 is in contact with the protective coating layer OC without the metal pattern MP therebetween. The extension parts EX of the metal pattern MP are extended to an edge of the display panel. Further, open pads OP are respectively formed at ends of the extension parts EX of the metal pattern MP, and the protective coating layer OC exposes the open pads OP. That is, the metal pattern MP is covered by the insulating protective coating layer OC except the open pads OP, so that the open pads OP are defined.

The lower polarizing plate 210 is bonded to the bottom surface of the lower substrate 230 on which the metal pattern MP and the protective coating layer OC are formed. Details of the positional relationship between the lower polarizing plate 210 and the metal pattern MP and the positions of the open pads OP will be described later with reference to FIG. 4 and FIG. 5.

Figure 4:
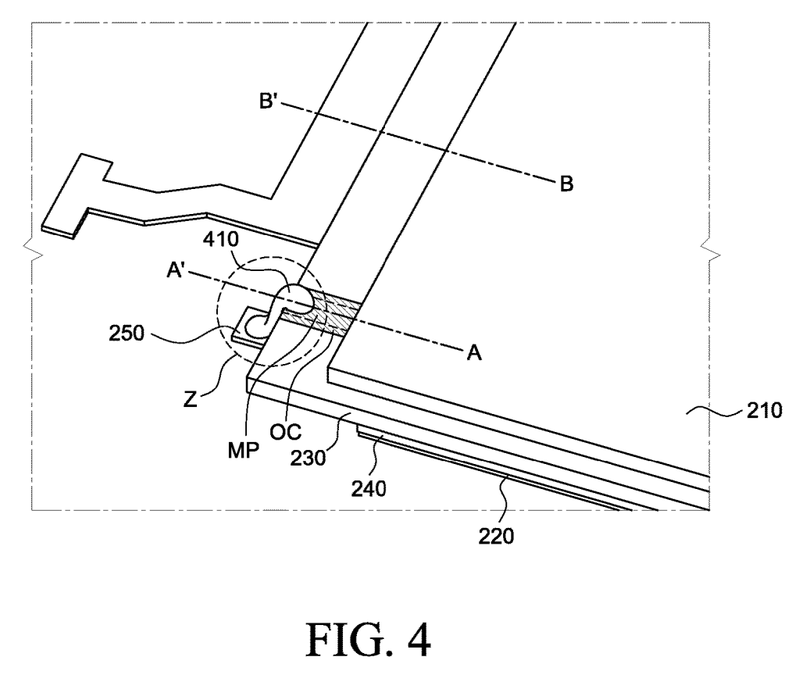
FIG. 4 is a partial perspective view of a display panel illustrating a connection structure of an extension part of a metal pattern positioned on a bottom surface of a lower substrate of the display panel and an FPC positioned on a top surface of the lower substrate according to an exemplary embodiment of the present disclosure.

FIG. 4 is a partial perspective view of the display panel 110 illustrating a connection structure of the extension part EX of the metal pattern MP positioned on the bottom surface of the lower substrate 230 of the display panel and the FPC 250 positioned on the top surface of the lower substrate 230. FIG. 5 is an enlarged perspective view enlarging an area Z illustrated in FIG. 4.

After the washing process with distilled water, the lower polarizing plate 210 and the upper polarizing plate 220 are respectively bonded to a bottom surface and a top surface of the cell. The lower polarizing plate 210 is bonded to the bottom surface of the lower substrate 230 so as to be overlapped with the metal pattern MP. In this case, the lower polarizing plate 210 exposes the extension parts EX of the metal pattern MP in order for the open pads OP not to be covered by the lower polarizing plate 210. In addition, the lower polarizing plate 210 may be bonded to overlap with the active area A/A without being overlapped with the extended parts EX. As described above, the FPC connection pad 251 is disposed on the partial area of the FPC 250 which protrudes without being overlapped with the lower substrate 230. The open pads OP are disposed on the extension parts EX protruding from the metal pattern MP. The partial area of the FPC 250 which protrudes without being overlapped with the lower substrate 230 and the extension parts EX are overlapped with the lower substrate 230 therebetween such that the FPC connection pad 251 is adjacent to the open pads OP. Further, a connection member 410 that electrically connects the FPC connection pad 251 and the open pads OP is formed on the FPC connection pad 251, a lateral surface of the lower substrate 230, and the open pads OP. The connection member 410 may be formed by printing the metal ink in a dot shape and then curing the metal ink. The metal ink may be silver (Ag) paste. Therefore, the connection member 410 may be thermally-cured silver (Ag) paste. That is, the open pads OP are covered by the thermally-cured silver (Ag) paste.

Figure 5:
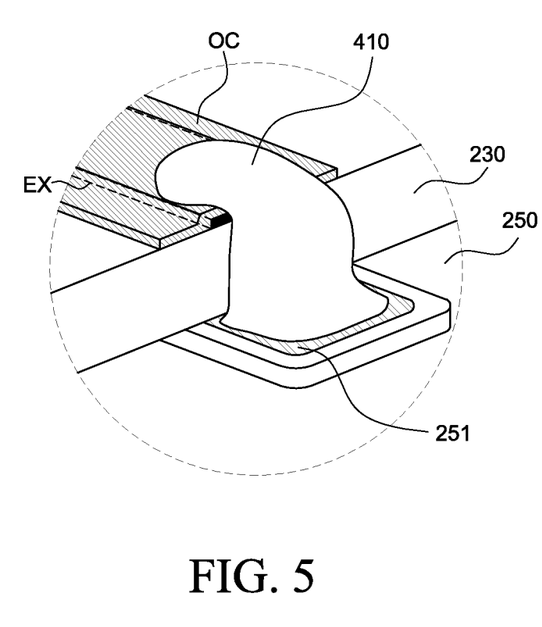
FIG. 5 is an enlarged perspective view enlarging area Z illustrated in FIG. 4.

Referring to FIG. 5, the connection between the FPC connection pad 251 and the open pads OP will be described in detail. The FPC connection pad 251 and the open pads OP are exposed toward the same direction. That is, the FPC connection pad 251 and the open pads OP are exposed toward the bottom surface of the display panel 110. Further, the metal ink is printed along the lateral surface of the lower substrate 230 so as to connect the FPC connection pad 251 to the open pads OP. In this case, the metal ink may be printed by a continuous discharge method or a discharge method corresponding to iterative pulses. The metal ink may cover all of the open pads OP and the FPC connection pad 251, or may cover only a part of the open pads OP or the FPC connection pad 251. Thus, the connection member 410 may be disposed to cover a part of the open pads OP and a part of the FPC connection pad 251. For example, the metal ink may include silver (Ag). Therefore, the connection member 410 maybe a streamlined structure formed of silver (Ag).

Figure 6:
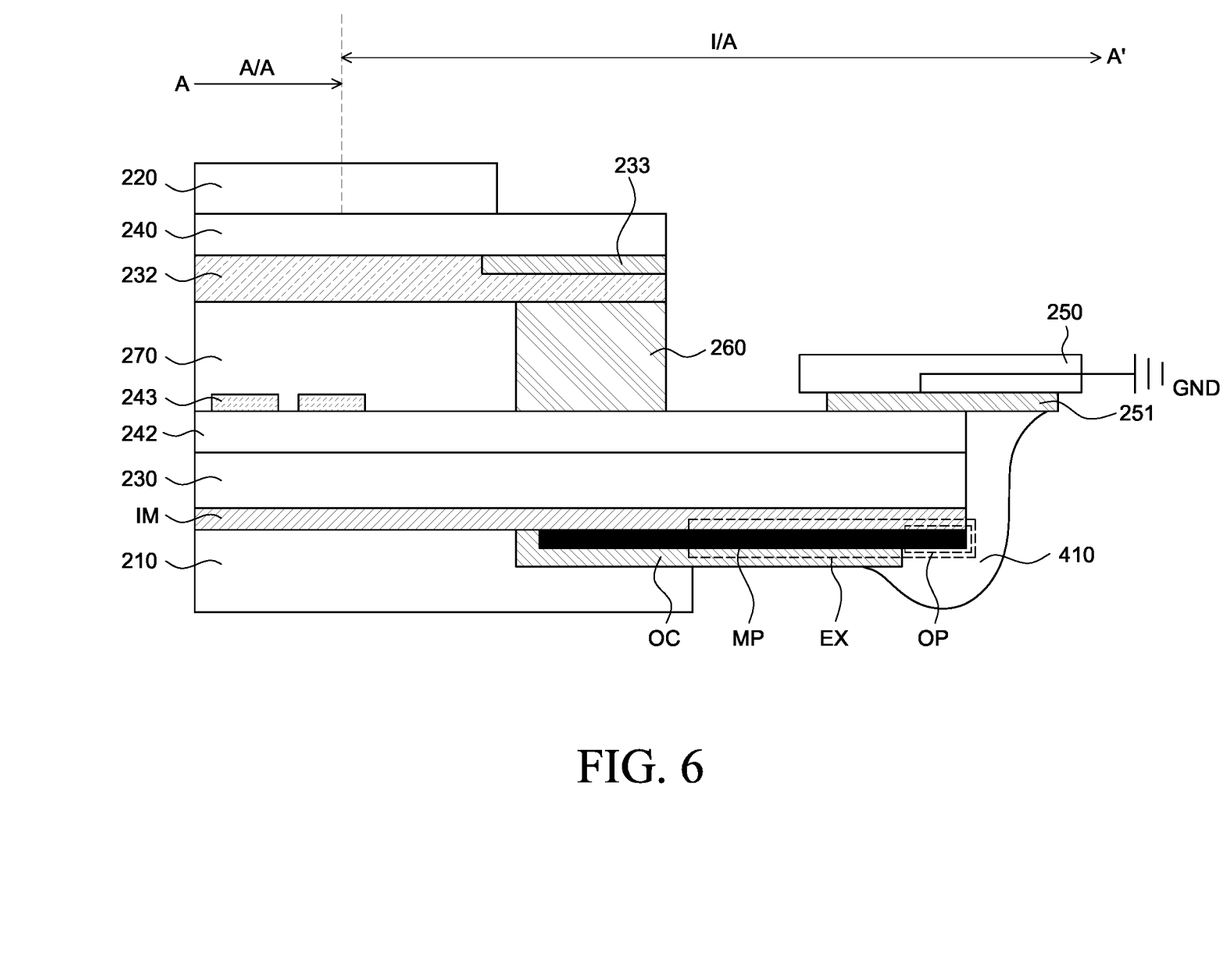
FIG. 6 is a cross-sectional view taken along line A-A' of FIG. 4.

FIG. 6 is a cross-sectional view taken along line A-A' of FIG. 4. More specifically, FIG. 6 is a cross-sectional view schematically illustrating a cross-section of the display panel 110 cut along line A-A' of FIG. 4.

Referring to FIG. 6, the display panel 110 according to an exemplary embodiment of the present disclosure is divided into the active area A/A and the inactive area I/A on an outer periphery of the active area A/A. The active area A/A refers to an area where an image is actually displayed on the display panel 110, and the inactive area I/A refers to an area other than the area where an image is actually displayed on the display panel 110. The inactive area I/A is positioned around the active area A/A so as to surround the active area A/A. For example, the inactive area I/A may have a closed-loop shape such as a ring.

The upper substrate 240 and the lower substrate 230 facing each other are also divided into the active area A/A and the inactive area I/A surrounding the active area A/A. The lower substrate 230 may have a greater size than the upper substrate 240. The lower substrate 230 and the upper substrate 240 may function as a supporting member and a protective member on which various components included in the display panel 110 are disposed. The lower substrate 230 and the upper substrate 240 may be fixed in a flat state or fixed in a bent state, or may be repetitively bent and stretched. The lower substrate 230 and the upper substrate 240 may be formed of a glass or plastic-based polymer material. The lower substrate 230 and the upper substrate 240 have light transmissive characteristic and thus may be transparent or translucent.

The display panel 110 includes the color filter layer 232, a light control layer 270, and the pixel-array layer 242 between the lower substrate 230 and the upper substrate 240 bonded facing each other. A state in which the lower substrate 230 on which the pixel-array layer 242 is disposed and the upper substrate 240 on which the color filter layer 232 is disposed are bonded to each other as being spaced away from each other is referred to as a cell. The display panel 110 in a cell state includes the light control layer 270 between the upper substrate 240 and the lower substrate 230. The light control layer 270 includes a light control material. The upper polarizing plate 220 and the lower polarizing plate 210 may be respectively bonded to a top surface and a bottom surface of the display panel 110 in a cell state.

The light control material controls and filters the light generated from the display device 100 in order for each pixel of the display device 100 to emit light with a specific brightness. For example, the light control material may be liquid crystal that allows each pixel to emit light with a controlled brightness using polarity of the light generated from the backlight unit 120 in back of the light control material. Alternatively, the light control material may be an organic light emitting element in which each pixel emits light with a controlled brightness. That is, in a predetermined gap between the upper substrate 240 and the lower substrate 230, the liquid crystal or the organic light emitting element may be disposed. FIG. 1 illustrates an example where the display device 100 according to an exemplary embodiment of the present disclosure is a liquid crystal display device including the backlight unit 120. However, the present disclosure is not limited thereto. It should be understood that in an organic light emitting display device, an organic light emitting elements serves as a light control material and the backlight unit 120 is not included, but the pressure-sensitive touch sensor 125 is separately included.

In order to bond the upper substrate 240 and the lower substrate 230, a sealant 260 is coated on the inactive area I/A between the upper substrate 240 and the lower substrate 230. The light control layer 270 is surrounded by the sealant 260.

The color filter layer 232 disposed on the bottom surface of the upper substrate 240 is divided into a plurality of color filters and may include a black matrix 233 to cover the inactive area I/A of the display panel 110. The black matrix 233 may include a photosensitive pigment or carbon black. The black matrix 233 may absorb light and may not reflect light. The black matrix 233 is configured to cover various components under the black matrix 233 so as not to be visually recognized by a user when the user sees the display device 100. The metal pattern MP is disposed under the black matrix 233 and thus may also be covered by the black matrix 233.

The pixel-array layer 242 disposed on the top surface of the lower substrate 230 includes a plurality of pixel drive circuits respectively corresponding to a plurality of pixels. The in-cell capacitive touch sensor 243 is embedded in the pixel-array layer 242.

The display device 100 according to an exemplary embodiment of the present disclosure includes the in-cell capacitive touch sensor 243 directly deposited on the lower substrate 230 within the display panel 110. Further, the display device 100 according to an exemplary embodiment of the present disclosure includes the pressure-sensitive touch sensor 125 outside the display panel 110. That is, the display device 100 according to an exemplary embodiment of the present disclosure recognizes a touch by a combination of a plurality of touch sensors. Thus, the display device 100 includes the in-cell capacitive touch sensor 243 between the upper substrate 240 and the lower substrate 230 of the display panel 110 and the pressure-sensitive touch sensor 125 under the display panel 110. FIG. 6 illustratres an example where the display panel 110 includes the in-cell capaitive touch sensor 243 disposed between the upper substrate 240 and the lower substrate 230. However, the present disclosure is not limited thereto. The display panel 110 may include one of various types of touch sensors, for example, an on-cell touch sensor disposed on a top surface of the upper substrate 240 or a hybrid touch sensor disposed on a top surface of the upper substrate 240 or a top surface of the lower substrate 230. The pressure-sensitive touch sensor 125 may be disposed under the display panel 110 as being embedded in the backlight unit 120.

In this case, the in-cell capacitive touch sensor 243 may be a projected capacitive touch sensor. The projected capacitive touch sensor recognizes a touch and touch coordinates on the basis of a change in the amount of electric charge between electric charge accumulated between the touch sensor and a user's finger with static electricity and flowing through the body of the user when the user's finger touches the display device 100 and electric charge accumulated when a contact is not made. Herein, the pressure-sensitive touch sensor 125 may be a resistive touch sensor. The display device 100 according to an exemplary embodiment of the present disclosure obtains touch coordinates using the in-cell capacitive touch sensor 243 and also obtains a touch pressure using the pressure-sensitive touch sensor 125. The touch coordinates and the touch pressure can be recognized at the same time. To this end, the pressure-sensitive touch sensor 125 may be applied with a first touch driving signal and the in-cell capacitive touch sensor 243 may be applied with a second touch driving signal.

A driving period of the display panel 110 may be the repetition of a driving period of displaying an image and a driving period of recognizing a user's touch. A voltage (e.g., a common voltage) to be commonly applied to all pixels is applied to each pixel through a common electrode, which is one of the two electrodes constituting each pixel. Herein, if the common electrode comprises a plurality of common electrode blocks, a common voltage is applied during the driving period of displaying an image by the display panel 110. Further, a touch sensing signal may be applied during the driving period of recognizing a user's touch by the display panel 110. That is, the in-cell capacitive touch sensor 243 may comprise a plurality of common electrode blocks.

If the common electrode is used only for displaying an image on the display panel 110, it may be manufactured into an integrated thin film-type electrode with respect to all pixels. However, if the common electrode is used for displaying an image on the display panel 110 and also recognizing user's touch coordinates on the display panel 110, the common electrode is beneficially divided into a plurality of common electrode blocks to recognize user's touch coordinates. As a result, the in-cell capacitive touch sensor 243 may be comprise a plurality of common electrode blocks and may be implemented to be suitable for time division driving to function as a common electrode and a touch electrode.

More specifically, if the display panel 110 is driven to display an image during a display driving mode, a common voltage is applied to the plurality of common electrode blocks. That is, each of the plurality of common electrode blocks functions as a common electrode facing a pixel electrode and forming an electric field. Further, if the display panel 110 is driven to recognize a user's touch during a touch driving mode, a touch driving voltage is applied to the plurality of common electrode blocks. Then, a user's touch is sensed by recognizing a capacitance formed between a touch pointer (e.g., a user's finger, a pen, etc.) and a common electrode block corresponding to a position of the touch pointer. That is, the plurality of common electrode blocks also function as the in-cell capacitive touch sensor 243.

In order to transfer a common voltage or a second touch driving signal to the plurality of common electrode blocks, a plurality of touch signal lines respectively corresponding to the plurality of common electrode blocks may be connected. If a driving mode of the display panel 110 is a display driving mode, a common voltage supplied from a common voltage supply unit is equally applied to all of the plurality of common electrode blocks through the plurality of touch signal lines. If a driving mode of the display panel 110 is a touch driving mode, a second touch driving signal generated in a second touch integrated circuit is transferred to all or some of the plurality of common electrode blocks through the plurality of touch signal lines.

The second touch driving signal supplied from the second touch integrated circuit or the common voltage supplied from the common voltage supply unit are transferred to the plurality of common electrode blocks through the plurality of touch signal lines. The second touch integrated circuit or the common voltage supply unit is disposed on one side of an edge of the display panel 110. Thus, the plurality of touch signal lines are connected to each common electrode block and extended to the one side of the edge of the display panel 110. The plurality of touch signal lines connected from each of the plurality of common electrode blocks to the one side of the edge of the display panel 110 are positioned corresponding to the active area A/A on the pixel-array layer 242. The plurality of common electrode blocks may be connected to each other in contact with the plurality of touch signal lines or may be connected to each other through an additional contact pattern. That is, each of the plurality of common electrode blocks is electrically connected to the plurality of touch signal lines.

Herein, the plurality of touch signal lines are disposed between the plurality of common electrode blocks and the lower substrate 230 in the active area A/A. In other words, the plurality of touch signal lines are disposed on the pixel-array layer 242 in the active area A/A. That is, the plurality of touch signal lines are included in a pixel drive circuit as one component of the pixel drive circuit. However, the position of the plurality of touch signal lines is not limited thereto. For example, the plurality of touch signal lines may be disposed on the same plane as components constituting the plurality of thin film transistors or may be disposed higher than the components. The plurality of common electrode blocks are disposed on the plurality of thin film transistors included in the pixel drive circuit by way of example.

The FPC 250 may include various integrated circuits such as a first touch integrated circuit or a second touch integrated circuit. A chip-type first touch integrated circuit or second touch integrated circuit may be bonded to the FPC 250. In the FPC 250, a line connected to the first touch integrated circuit or second touch integrated circuit disposed outside the display panel may be disposed. Herein, the second touch integrated circuit and the first touch integrated circuit may be different components or may be the same component. Otherwise, in the FPC 250, a line to which a ground voltage is applied from the system may be disposed. The extended line of the FPC 250 forms an end of the FPC connection pad 251. A predetermined electrical signal is applied from the FPC connection pad 251 to the conductive layer IM. Herein, the open pad OP of the metal pattern MP is electrically connected to the FPC connection pad 251 through the connection member 410. Thus, the conductive layer IM can be electrically connected to the FPC connection pad 251.

The conductive layer IM is deposited so as to cover the bottom surface of the lower substrate 230. That is, the conductive layer IM covers an entire bottom surface of the lower substrate 230 generally corresponding to the active area A/A and the inactive area I/A. In addition, the conductive layer IM may be deposited to cover the bottom surface of the lower substrate 230 and not to overlap with a portion of the inactive area I/A. The conductive layer IM is disposed between the pressure-sensitive touch sensor 125 and the in-cell capacitive touch sensor 243. The conductive layer IM may be deposited on the bottom surface of the lower substrate 230 so as to be disposed between the pressure-sensitive touch sensor 125 and the in-cell capacitive touch sensor 243. The conductive layer IM provides an equipotential surface on the bottom surface of the lower substrate 230 and thus can reduce or minimize interference among various electrical signals.

For example, the conductive layer IM can suppress interference between the first touch driving signal and the second touch driving signal. To this end, the conductive layer IM may be electrically connected to a ground line of the system so as to be grounded. That is, the conductive layer IM may provide a smooth discharge path to the display panel 110. In this case, a predetermined electrical signal applied to the conductive layer IM is a ground voltage. Alternatively, in order to sense a user's touch pressure, the conductive layer IM may be a touch sensor facing the pressure-sensitive touch sensor 125. In this case, a predetermined electrical signal applied to the conductive layer IM may be a third touch driving signal which forms a potential difference in response to the first touch driving signal and thus enables force or pressure sensing. Alternatively, in order to sense a user's touch pressure, the conductive layer IM may be a secondary touch sensor of the pressure-sensitive touch sensor 125. In this case, like the pressure-sensitive touch sensor 125, the conductive layer IM may be applied with the first touch driving signal through the first touch integrated circuit.

The conductive layer IM is formed of a material which can form an equipotential surface more rapidly and uniformly. The conductive layer IM is positioned on a path of the light generated in the display device 100 and radiated to the outside of the display device 100. Thus, preferably, the conductive layer IM may have an excellent optical performance. For example, the conductive layer IM may be formed of a light-transmitting material such that the light radiated from the backlight unit 120 under the display panel 110 to the outside of the display device 100 through the lower polarizing plate 210 can pass through. Preferably, the conductive layer IM may have an average light transmittance of 90% or more in the visible light wavelength range. Further, preferably, the conductive layer IM may have an average light reflectance of less than 1% in the visible light wavelength range. Thus, a decrease in visibility of the display device 100 caused by reflection of an external light incident into the display device 100 from the outside can be reduced or minimized. For example, the conductive layer IM may be formed of indium-tin oxide (ITO) so as to have light transmissive characteristic and also a high electrical conductivity.

However, the conductive layer IM is beneficially optically transparent. Thus, there is a limit in increasing a thickness of the conductive layer IM to reduce a sheet resistance of the conductive layer IM. That is, if a thickness of the conductive layer IM is increased in order for the conductive layer IM to be a uniform equipotential surface in a short time, the light transmittance of the conductive layer IM is decreased. Therefore, the metal pattern MP is formed along an edge of the conductive layer IM in order for the conductive layer IM to be a uniform equipotential surface in an entire area in a short time and to not decrease the light transmittance of the conductive layer IM.

The conductive layer IM is electrically connected to the FPC 250 through the metal pattern MP and the connection member 410. For example, the conductive layer IM is formed of indium-tin oxide (ITO) and the metal pattern MP is formed of silver (Ag), the metal pattern MP has a lower sheet resistance than the conductive layer IM. Herein, as illustrated in FIG. 6, a contact resistance at an interface formed when the metal pattern MP is positioned on the bottom surface of the conductive layer IM is lower than a contact resistance at an interface formed assuming that the FPC 250 is in contact with the conductive layer IM. With the metal pattern MP having a high electrical conductivity and electrically connecting the conductive layer IM and the FPC 250, an electrical signal can be rapidly transferred to all edges of the conductive layer IM. Thus, the conductive layer IM can be an equipotential surface more rapidly and uniformly. Further, if the connection member 410 is formed of the same material as the metal pattern MP, a contact resistance at an interface formed between the metal pattern MP and the connection member 410 can be reduced. Furthermore, with the connection member 410 having a high electrical conductivity like the metal pattern MP, an electrical signal can be transferred more readily to the open pad OP of the metal pattern MP.

Figure 7:
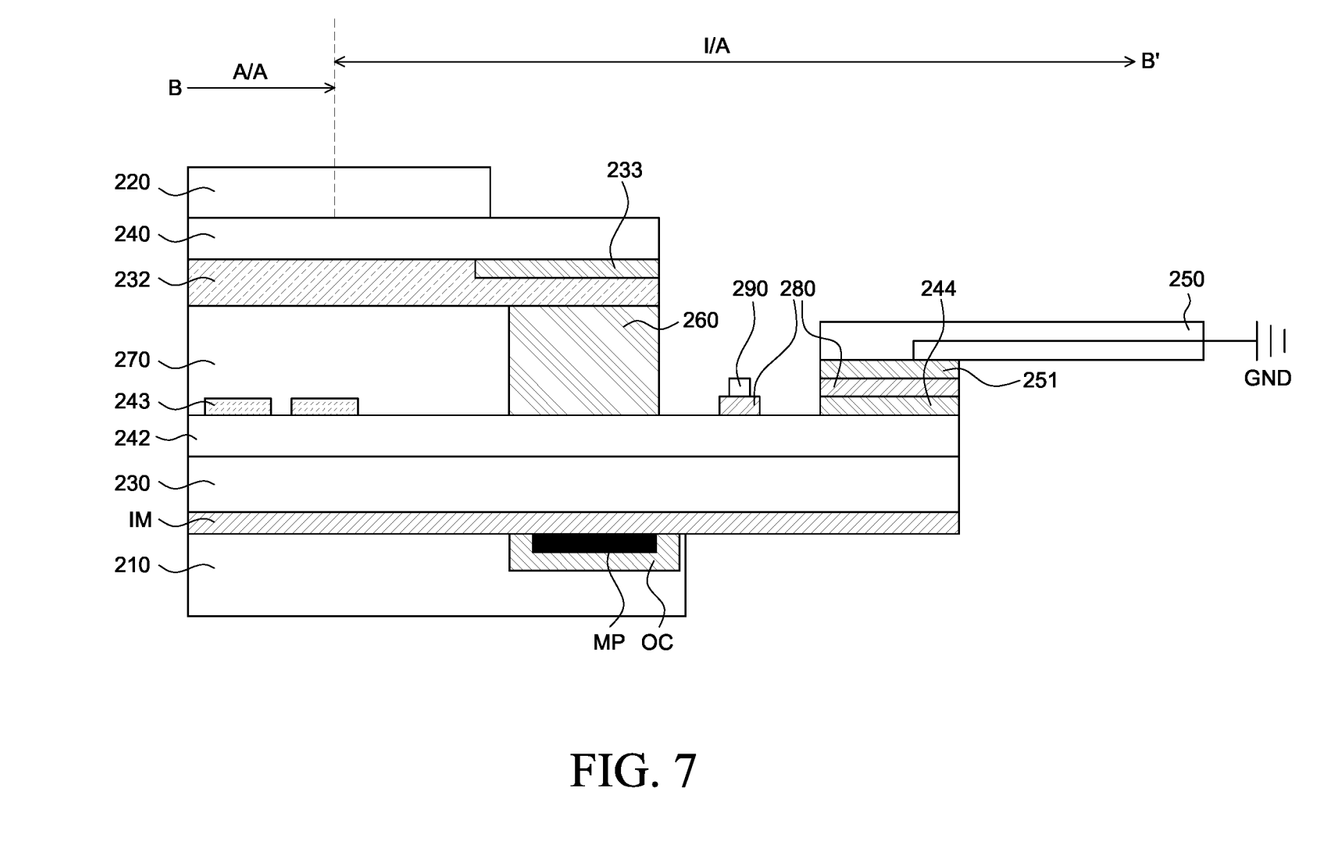
FIG. 7 is a cross-sectional view taken along line B-B' of FIG. 4.

FIG. 7 is a cross-sectional view taken along line B-B' of FIG. 4. More specifically, FIG. 7 is a cross-sectional view schematically illustrating a cross-section of the display panel 110 cut along line B-B' of FIG. 4. That is, as compared with FIG. 6, FIG. 7 shows a cross-sectional view of a part other than the part where the open pad OP of the metal pattern MP and the FPC connection pad 251 are electrically connected to each other in the display panel 110 illustrated in FIG. 4. More specifically, FIG. 7 is a cross-sectional view of a part where the source driver 290 is disposed between two extension parts EX if the metal pattern MP has the two extension parts EX as illustrated in FIG. 3.

Referring to FIG. 7, the source driver 290 configured to apply an electrical signal to the data lines on the top surface of the lower substrate 230 is mounted in the form of a drive integrated circuit (IC) chip corresponding to the inactive area I/A. A pad 244 configured to receive various electrical signals applied to the pixel-array layer 242 may be disposed on an edge of the pixel-array layer 240. The pad 244 may be electrically connected to the FPC connection pad 251 by an anisotropic conductive film (ACF) 280. In this case, an FPC connection pad 251 electrically connected to the pad 244 may be identical to or different from the FPC connection pad 251 electrically connected to the metal pattern MP as illustrated in FIG. 6. The ACF film 280 is formed by dispersing conductive particles within a resin film. The conductive particles turn on electricity by electrically connecting the pad 244 and the FPC connection pad 251 when the film is cured as being pressed and by heat and pressure. Meanwhile, in an area where the extension parts EX do not protrude, the metal pattern MP is entirely covered by the protective coating layer OC and overlapped with the lower polarizing plate 210. The metal pattern MP is disposed corresponding to the inactive area I/A.

That is, referring to FIG. 4, FIG. 6, and FIG. 7, in the display device 100 according to an exemplary embodiment of the present disclosure, the metal pattern MP having a closed-loop shape and wrapped around the inactive area I/A is disposed under the lower substrate 230. Each extension part EX of the metal pattern MP is disposed on both sides of the source driver 290, and the open pad OP is exposed at an end of each extension part EX. The FPC connection pad 251 is further protruded than an edge of the lower substrate 230 so as to correspond to the extension part EX. The FPC connection pad 251 and the open pad OP of the metal pattern MP are electrically connected by the connection member 410. The connection member 410 is fixed as being in contact with a lateral surface of the lower substrate 230. That is, the conductive layer IM covering the bottom surface of the lower substrate 230 and the FPC 250 disposed on the top surface of the lower substrate 230 are electrically connected by the metal pattern MP and the connection member 410.

The display device 100 according to an exemplary embodiment of the present disclosure has been described in which the backlight unit 120 including the light source 124 is included by way of example, but the present disclosure is not limited thereto. For example, if a light control material is implemented by an organic light emitting element which typically does not need a separate light source 124 outside the display panel 110, the backlight unit 120 can be substituted by the pressure-sensitive touch sensor 125.

According to an exemplary embodiment of the present disclosure, there is provided a display device including:

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:
1. A display device comprising:
  a display panel defined with an active area displaying an image and an inactive area outside the active area, the display panel including a substrate having a first surface and a second surface opposite the first surface;
  a plurality of pixels on the first surface of the substrate in the active area, each pixel including a pixel drive circuit;
  a transparent conductive layer on the second surface of the substrate covering the active area and a part of the inactive area;
  a metal pattern on the second surface of the substrate in the inactive area, the metal pattern electrically connected to the transparent conductive layer, receiving an electrical signal and having a lower resistance than the transparent conductive layer, and a protective coating layer on the metal pattern, the protective coating layer surrounding the active area along the inactive area, having closed-loop shape covering the closed-loop part of the metal pattern and having a width greater than the metal pattern, wherein the metal pattern serves as a conductive path to reduce a potential difference with respect to the electrical signal in an entire area of the transparent conductive layer compared to a display device without the metal pattern, wherein the metal pattern includes a closed-loop part and an extension part that is extended from the closed-loop part toward an edge of the second surface of the substrate and receives the electrical signal through an open pad in which the metal pattern is exposed through the protective coating layer, and wherein the closed-loop part and the extension part are disposed on the same plane.

2. The display device according to claim 1, further comprising a first type of touch sensor inside or above the display panel and a second type of touch sensor under the display panel, the display device determining a user's touch through a combination of the first and second types of touch sensor.

3. The display device according to claim 2, wherein the first type of touch sensor is an in-cell capacitive touch sensor using a common electrode of the display panel as a sensor electrode.

4. The display device according to claim 2, wherein the second type of touch sensor is a pressure sensitive touch sensor.

5. The display device according to claim 1, wherein the transparent conductive layer is one of a shielding layer, an electrode of a sensor and a facing sensor of a pressure-sensitive touch sensor.

6. The display device according to claim 1, wherein the transparent conductive layer has a multi-layered structure in which a layer having a high refractive index and a layer having a low refractive index are alternately laminated.

7. The display device according to claim 1, wherein the transparent conductive layer has a sheet resistance of less than 300 Ω/sq and the metal pattern has a line resistance of 1 n/mm or less.

8. The display device according to claim 1, wherein the metal pattern is in direct contact with an outer edge of the transparent conductive layer.

9. The display device according to claim 1, wherein the metal pattern surrounds the active area of the substrate.

10. The display device according to claim 1, wherein the metal pattern is formed by a printing or dispensing method using a metal ink.

11. The display device according to claim 10, wherein a thickness of the metal pattern is greater than a thickness of the transparent conductive layer.

12. A display device comprising:
a display panel defined with an active area displaying an image and an inactive area outside the active area, the display panel including a substrate having a first surface and a second surface opposite the first surface;
a plurality of pixels on the first surface of the substrate in the active area, each pixel including a pixel drive circuit;
a transparent conductive layer on the second surface of the substrate covering the active area and a part of the inactive area; and
a metal pattern on an outer edge of the transparent conductive layer in the inactive area,
a protective coating layer on the metal pattern, the protective coating layer surrounding the active area along the inactive area, having closed-loop shape covering the closed-loop part of the metal pattern and having a width greater than the metal pattern,
wherein the metal pattern includes a closed-loop part and an extension part that is extended from the closed-loop part toward an edge of the second surface of the substrate and receives an electrical signal or a ground voltage through an open pad in which the metal pattern is exposed through the protective coating layer, and
wherein the closed-loop part and the extension part are disposed on the same plane.

13. The display device according to claim 12, wherein the metal pattern surrounds the active area of the substrate.

14. The display device according to claim 12, wherein the transparent conductive layer has a multi-layered structure in which a layer having a high refractive index and a layer having a low refractive index are alternately laminated.

15. The display device according to claim 12, wherein the transparent conductive layer has a sheet resistance of less than 300 Ω/sq and the metal pattern has a line resistance of 1 Ω/mm or less.

16. The display device according to claim 12, wherein the open pad at an end of the extension part is electrically connected to a Flexible Printed Circuit (FPC) to receive the electrical signal or the ground voltage.

17. The display device according to claim 16, further comprising a connection member that electrically connects the FPC and the open pad.

18. The display device according to claim 12, further comprising a first type of touch sensor inside or above the display panel and a second type of touch sensor under the display panel, the display device determining a user's touch through a combination of the first and second types of touch sensor.

* * * * *